Patented Oct. 20, 1925.

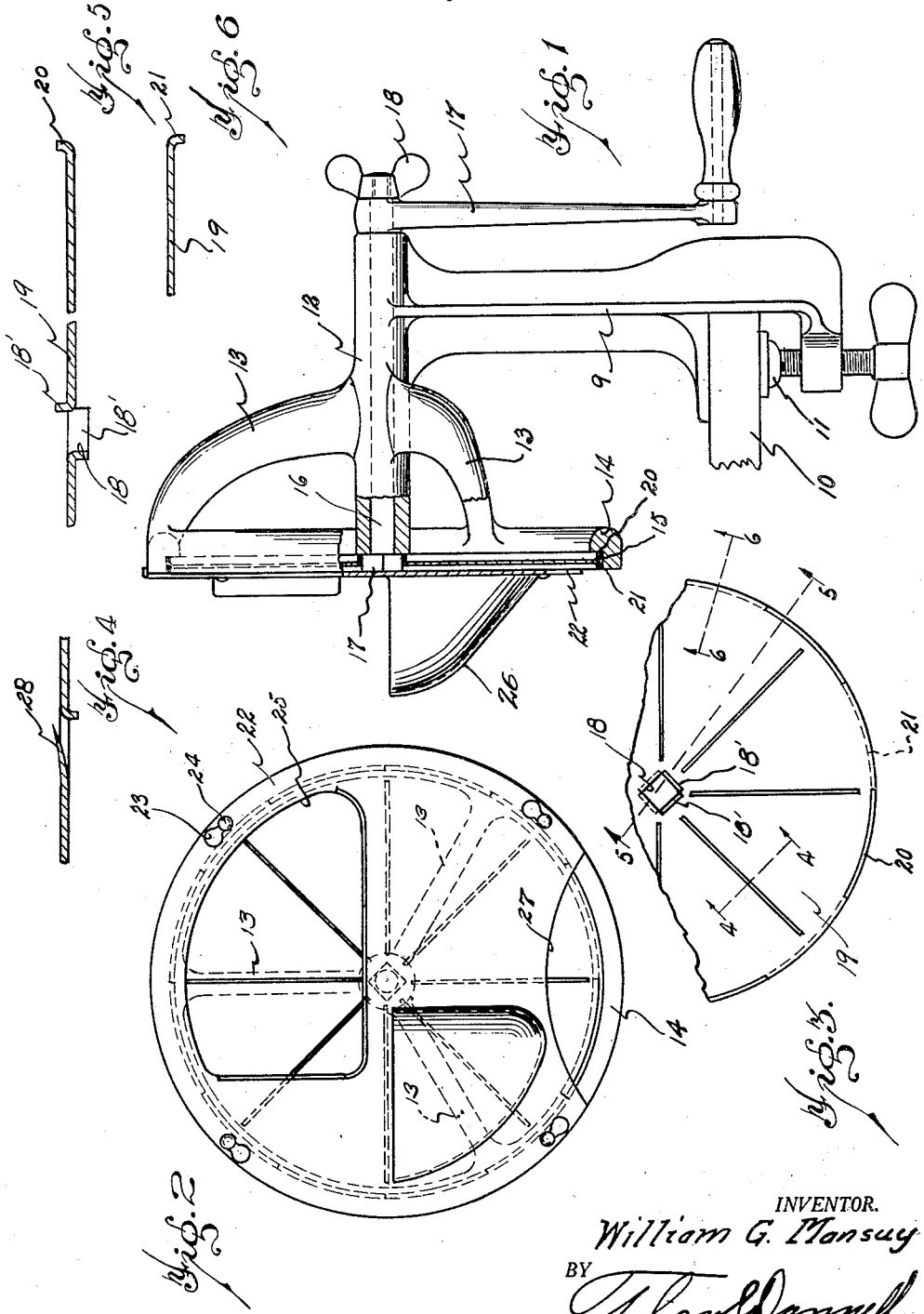

1,558,197

UNITED STATES PATENT OFFICE.

WILLIAM G. MANSUY, OF DETROIT, MICHIGAN.

FOOD CUTTER.

Application filed April 16, 1925. Serial No. 23,508.

To all whom it may concern:

Be it known that I, WILLIAM G. MANSUY, a citizen of the United States, residing at Detroit, in the county of Wayne and State of Michigan, have invented a new and useful Improvement in a Food Cutter, of which the following is a specification.

My invention relates to a new and useful improvement in a food cutter, adapted for slicing, or grating vegetables and fruits such as potatoes and apples, etc. In the illustration given, the plate used for cutting the food is adapted solely for slicing, although it will be apparent that other cutting discs may be used, which will be adapted for grating, grinding, etc., depending upon the structure of the cutting disc used.

An object of the invention is the provision in a food cutter of this class, of a mechanism having a readily removable cutter which is mounted upon an operating shaft in loose position and held in operative position by a readily removable cover, so that the cutting element may be quickly removed and replaced with a different style of cutting element.

Another object of the invention is the provision in a food chopper, of a cutting element having peripheral edges laterally turned, oppositely, alternately, so as to afford a bearing and guiding surface for facilitating the efficient operation of the cutter, when in use.

Another object of the invention is the provision in a food cutter of this class, of a hopper formed from the retaining cover, so that small particles of food may be placed in the hopper, for cutting, when reduced to such dimensions as to render it no longer safe to hold the food in the fingers.

Another object of the invention is the provision of a food cutter of this class, which will be simple in structure, economical of manufacture and highly efficient in use.

Other objects will appear hereinafter.

The invention consists in the combination and arrangement of parts hereinafter described and claimed.

The invention will be best understood from a reference to the accompanying drawings which form a part of this specification and in which—

Fig. 1 is a side elevational view of the invention, showing parts in section,

Fig. 2 is a front elevational view of the invention,

Fig. 3 is a fragmentary front elevational view of a cutting element used in the invention, Fig. 4 is a sectional view taken on substantially line 4—4 of Fig. 3, Fig. 5 is a sectional view taken on substantially line 5—5 of Fig. 3, Fig. 6 is a sectional view taken on substantially line 6—6 of Fig. 3.

In the drawings, the invention comprises a supporting member 9, which is made, preferably, from cast metal, and adapted to be clamped upon a table 10, or other supporting surface by the screw operated clamping foot 11. Formed preferably integral with the supporting standard 9 is a tubular bearing 12, from which radiate tripod-forming-arms 13, which serve to support the rim 14, said rims having a recess 15 formed therein. Projected through the bearing 12 is a shaft 16, upon one end of which is mounted an operating handle 17 and retained in position by means of the wing nut 18. The opposite end of the shaft 16 is formed square as at 17 and adapted for projection through a square opening 18 formed in a cutting element which is made from a disc 19 having its peripheral edges laterally turned in opposite directions alternately as at 20 and 21. When the cutting element is formed in this manner, and placed upon the square portion 17 of the shaft 16, a rotation of the shaft 16 will effect a rotation of the disc 19, the lateral edges of the portions 20 serving to bear against the face of the rim 14 and the outer edges of the portions 21 serving to bear against a retaining cover or disc 22. The marginal edges 18′ of the disc 19, at the opening 18, are laterally turned to form a support or bearing for engaging the square portion 17 of the shaft 16. The cover or disc 22 is provided, along its edges, with enlarged openings 23 through which may be projected the heads 24 of studs or rivets mounted in the rim 14. The opening 23 communicates with a restricted portion, so that, when the cover 22 is placed in position to permit the studs 24 to project through the openings 23, a slight turning of the cover 22 in one direction will serve to lock it on the rim 14. In this way, the cutting element 19 is loosely positioned upon the square portion 17 of the shaft 16 and held in position solely by the presence of the cover 22. The cover 22 is provided, adjacent its upper portion, with an opening 25, at which the food may be held for being operated upon, when the cutting element 19 is being rotated.

When the food is reduced to a small particle, so that it would be no longer easy or safe for the operator to hold the food in his fingers, the particle may be deposited in a hopper 26, formed on the front of the cover 22, so that the cutting element 19 may then serve to cut the food deposited in the hopper. This hopper 26 is preferably made by punching a portion of the cover 22 outwardly and drawing it to the proper dimensions. The lower end of the cover 22 is provided with an opening 27 through which small particles of food may pass when deposited between the outer face of the cutter and the inner face of the cover 22. The food, when being cut, will ordinarily pass to the rear of the cutting element 19 and be permitted to drop downwardly into a vessel provided for its reception.

In the particular form of cutting element shown in the drawings, the cutting element comprises a disc 19 having tongues 28 punched therefrom and sharpened at their ends. If desired, the disc 19 may be provided with a plurality of projections or serrations, for effecting a grating, crushing or pulverizing of the food, as desired, the particular form of cutting element being optional with the user.

With a food cutter of the class described, it is apparent that the cutting element may be easily and quickly removed and replaced, to effect various operations upon the food to be cut, grated, etc. It is apparent that by flexing the tongues 28 outwardly at varying angles, the thickness of the cut will be regulated.

While I have illustrated and described the preferred form of structure, I do not wish to limit myself to the precise form of structure shown, but desire to avail myself of such variations and modifications as come within the scope of the appended claims.

Having thus described my invention, what I claim as new, and desire to secure by Letters Patent is:

1. A food cutter comprising a supporting member; a rim member mounted on said supporting member and having its inner face cut-away at its inner edges to provide a recess; a rotatable shaft mounted on said supporting member and extending axially of said rim member, the end of said shaft adjacent said rim member being provided with flat faces; a cutting element comprising a disc having an opening formed centrally thereof for receiving the flat faces of said shaft, the edges of said disc at said opening being angularly turned, the alternate parts being oppositely turned, the peripheral edges of said disc being angularly turned alternately in opposite directions; a closure detachably mounted on said rim member and adapted for retaining said disc on said flat faces of said shaft, the angularly turned peripheral edge of said disc being adapted for engaging the inner face of said closure and the wall of said recess in said rim member.

2. A food cutter of the class described comprising a supporting member; a tubular sleeve mounted on said supporting member; a rim portion mounted on said sleeve; a shaft projected through said sleeve, the end of said shaft adjacent said rim member being provided with flat faces; a cutting element comprising a disc having an opening formed centrally thereof adapted for the reception of said flat faces of said shaft, said opening being of a shape to conform with the contour of said shaft at said flat faces, said disc being angularly turned alternately in opposite directions on the face of said shaft for affording a support for said disc on said shaft, the periphery of said disc being angularly turned alternately in opposite directions, the angularly turned peripheral portions at one side of said disc being adapted for engaging said rim member; a detachable closure mounted on said rim member for retaining said disc in operative relation to said shaft, the angularly turned peripheral portions on the other side of said disc being adapted for engaging the inner face of said closure.

3. A food cutter of the class described comprising a supporting member; a rim member carried by said supporting member; a rotatable shaft carried by said supporting member extending axially of said rim member, said shaft having the end adjacent said rim member provided with flat faces; a cutting element comprising a disc adapted for mounting loosely on said flat faces, said disc having an opening formed therein of the contour of said shaft at said flat faces; and means cooperating with said rim member for retaining said disc in operative relation on said shaft.

4. A food cutter of the class described, comprising a supporting member; a stationary rim member carried by said suppporting member and having a recess formed on its inner surface; a rotatable shaft, carried by said supporting member, extending axially of said rim member, said shaft having the end, adjacent said rim member, provided with flat faces; a cutting element comprising a disc, adapted for mounting loosely on said flat faces, said disc having an opening formed therein of the contour of said shaft at said flat faces, the periphery of said disc being angularly turned, alternately in opposite directions, the angularly turned portions at one side of said disc being adapted for engaging the recess of said rim member; and a detachable closure mounted on said rim member, adapted for engaging on its inner surface the outer edges of the angularly turned peripheral portions on the other side of said disc, for retaining said disc in operative position on said shaft.

In testimony whereof, I have signed the foregoing specification.

WILLIAM G. MANSUY.